United States Patent [19]

Tokumaru et al.

[11] Patent Number: 4,807,175
[45] Date of Patent: Feb. 21, 1989

[54] BOOTH'S MULTIPLIER

[75] Inventors: Takeji Tokumaru; Hidechika Kishigami, both of Yokohama, Japan

[73] Assignee: Kabushiki Kaisha Toshiba, Kawasaki, Japan

[21] Appl. No.: 22,968

[22] Filed: Mar. 6, 1987

[30] Foreign Application Priority Data

Mar. 29, 1986 [JP] Japan ................... 61-69749

[51] Int. Cl.$^4$ .............................................. G06F 7/52
[52] U.S. Cl. ................................................. 364/760
[58] Field of Search .............. 364/754, 757, 760, 759

[56] References Cited

U.S. PATENT DOCUMENTS

| 4,153,938 | 5/1979 | Ghest et al. | 364/760 |
| 4,168,530 | 9/1979 | Gajski et al. | 364/760 |
| 4,546,446 | 10/1985 | Machida | 364/759 |
| 4,575,812 | 3/1986 | Kloker et al. | 364/760 |

OTHER PUBLICATIONS

IBM Technical Disclosure Bulletin, vol. 27, No. 11, Apr. 1985, "Improved Approach to the Use of Booth's Multiplication Algorithm", pp. 6624–6632.
Beraud et al. "Parallel Multiplier", IBM Tech. Disclosure Bulletin, vol. 24, No. 11B, 4/82, pp. 6090–6092.
Waser et al, "Real-Time Processing Gains Ground with Fast Digital Multiplier", Electronics, Sep. 29, 1977, pp. 93–99.
Nikkei Electronics–May 29, 1978 by Z. Tanaka, pp. 76–90.
Computer High-Speed Calculations "KINDAI KAGAKU" by Horikoshi–Sep. 1, 1981, pp. 152–157.

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

In Booth's method of calculating a product of a multiplicand X and a multiplier Y, Y is divided into plural partial multipliers $PP_i(Y_i, Y_{i+1}, Y_{i+2})$; partial products $PD_i$ are formed separately in sequence by multiplying X by each of decoded partial multiplier values $V_{pp}$ decoded in accordance with Booth theory; and all the partial products $PD_i$ are accumulatively added to obtain the product. To increase the processing speed twice in spite of a relatively simple circuit configuration, two partial products of X and $V_{pp}$ are formed simultaneously in sequence and added to obtain a partial product sum $PS_i$, and all the two partial product sums are accumulatively added to obtain a final result.

10 Claims, 9 Drawing Sheets

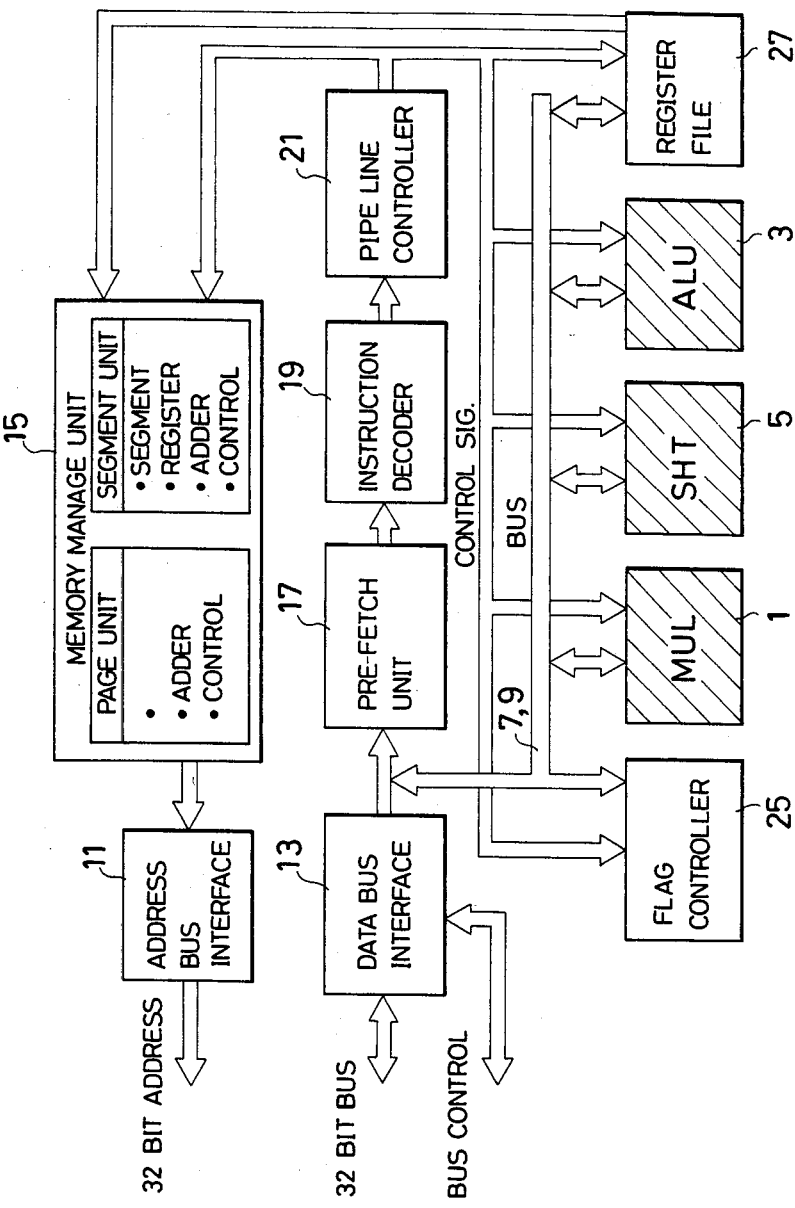

FIG. 4
BOOTH METHOD

```
                y7 y6 y5 y4 y3 y2 y1 y0 y-1
                              └─PP1─┘
                        └──PP2──┘
                  └──PP3──┘
            └──PP4──┘

0  0  0  0  1  1  0  1
              x)  0  0  1  0  0  1  0  0
PD1 →     ( 0  0  0  0  0  0  0  0
PD2 →     ( 0  0  0  0  0  0  1  1  0)
PD3 →     ( 1  1  1) 1  1  0  0  1  1  0
PD4 →     ( 0  0) 0  0  0  0  1  1  0  1
          ─────────────────────────────────
            0  0  0  0  1  1  1  0  1  0  0
```

| | V_PP |
|---|---|
| MULTIPLICAND (X) = 13 | |
| MULTIPLIER (Y) = 36 | |
| PP1  y_1=0, y_0=0, y_{-1}=0 | 0 |
| PP2  y_3=0, y_2=1, y_1=0 | +1 |
| PP3  y_5=1, y_4=0, y_3=0 | -2 |
| PP4  y_7=0, y_6=0, y_5=1 | -1 |
| PRODUCT = 468 | |

( ) INDICATES SIGN EXTENSION

PDi : PARTIAL PRODUCT
PPi : PARTIAL MULTIPLIER
V_PP : DECODED PARTIAL MULTIPLIER

BOOTH'S MULTIPLIER

BACKGROUND OF THE INVENTION

1. Field of the Invention

The present invention relates to a multiplier which can attain a high speed multiplication operation on the basis of a relatively simple circuit configuration.

2. Description of the Prior Art

Multipliers can be classified into roughly two, parallel and series, multipliers. In the series multiplier, the product of a multiplicand and a multiplier can be obtained in such a way that a multiplicand is multiplied by a multiplier digit by digit, the multiplication processing for each digit is shifted in sequence, and the multiplied results of all digits are accumulatively added.

More specifically, in the series multiplier, a partial product is formed by multiplying a multiplicand by a multiplier digit by digit, that is, bit by bit in a binary computer. For instance, in the case where the numbers of bits of a multiplier and a multiplicand are both 32 bits (32 bits×32 bits), the product can be obtained by forming 32 partial products of a 32-bit multiplicand and a one-bit multiplier and by accumulatively adding these 32 partial products. In the series multiplier, each partial product is formed for each digit of the multiplier in sequence and then accumulatively added in sequence in the order of the partial product formation. Therefore, one partial product forming circuit for forming many partial products and one adder circuit for sequentially and accumulatively adding these partial products are required. However, the calculation speed is slow.

In contrast with this, in the parallel multiplier, each partial product of a multiplicand and a multiplier is formed simultaneously for each digit, and all the partial products formed simultaneously are added also simultaneously, so that the calculation speed is very high. However, since all the partial products are formed and added simultaneously, in the case of a 32-bit multiplication, for instance, 32 partial product forming circuits and 32 adders for adding 32 partial products are necessary.

In addition, Booth's algorithm method is known as a method of multiplying a multiplicand by a multiplier in series and parallel fashion. In the series multiplier, multiplication is processed for each bit of a multiplier to form 32 partial products, for instance. In contrast with this, in this Booth method, partial products are formed every three bits of a multiplier and further one bit of these three bits is overlapped upon one of other adjacent three bits. As a result, in the case of 32 bit multiplication, only 16 partial products are formed. The 16 partial products are added to obtain a multiplied result. In this Booth method, since 16 partial products are formed in sequence every 3 bits of the multiplicand and then these partial products are added in sequence, only one partial product forming circuit and one adder are required as in the series multiplier, and advantageously the calculation speed thereof is two times higher than that of the series multiplier.

As explained above, although the series multiplier is simple and economical from the standpoint of circuit configuration, there exists a problem in that the calculation speed is very slow. Although the parallel multiplier is high in speed, there exists a problem in that many partial product forming circuits and adders are required, so that the cost is high and the space occupied by the circuit is voluminous. Further, in the Booth's algorithm multiplier belonging to between series and parallel circuits, although the speed is relatively high in spite of a relatively simple circuit configuration, the calculation speed is still slow as compared with that of the parallel multiplier. For instance, although the parallel multiplier can form and add partial products simultaneously, in the Booth method, 16 processing steps are required to process a multiplication of 32 bits, and therefore there still exists a problem in that the multiplication speed is 16 times slower than that of the parallel multipliers.

SUMMARY OF THE INVENTION

With these problems in mind, therefore, it is the primary object of the present invention to provide a high speed multiplier of a relatively simple circuit configuration.

To achieve the above-mentioned object, the multiplier according to the present invention comprises (a) partial multiplier forming means for forming a plurality of partial multipliers by dividing a multiplier into plural segments having plural predetermined digits; (b) partial product sum forming means for forming a partial product sum by adding two partial products formed by simultaneously multiplying a multiplicand by each of two partial multipliers of a plurality of the divided partial multipliers; (c) accumulative addition control means for controlling said partial product sum forming means so that partial product sums formed by said partial product sum forming means can sequentially be formed for all the partial multipliers in the same way as for the above two partial multipliers, and for accumulatively adding all the formed partial product sums.

To achieve the above-mentioned object, the method of multiplying a multiplicand X by a multiplier Y according to the present invention comprises the following steps of: (a) dividing plural bits of the multiplier Y into a plurality of partial multipliers PPi ($Y_i$, $Y_{i+1}$, $Y_{i+2}$) of 3 bits; (b) simultaneously decoding at least two partial multipliers in accordance with Booth's theory to generate at least two decoded partial multiplier value Vpp; (c) simultaneously calculating at least two partial products PDi of the two decoded partial multiplier values Vpp and each bit of the multiplicand X; (d) adding the simultaneously calculated at least two partial products PDi to obtain a partial product sum PSi; (e) sequentially repeating the above steps from (a) to (d) for all the remaining partial multipliers by shifting each of bits of the multiplier; and (f) accumulatively adding all the calculated partial product sums.

In the Booth method, a multiplier Y is divided into plural partial multiplier PPi ($Y_i$, $Y_{i+1}$, $Y_{i+2}$); partial products PDi are formed separately in sequence by multiplying a multiplicand X by each of decoded partial multiplier values $V_{pp}$ decoded in accordance with Booth theory; and all the partial products PPi are added to obtain the products. In the present invention, however, in order to increase the multiplication processing speed twice in spite of a relatively simple circuit configuration, two partial products of the multiplicand X and the decoded partial multiplier values Vpp are calculated simultaneously and added to obtain a partial product sum PSi, and all the product sums thus obtained are accumulatively added to obtain a final result.

BRIEF DESCRIPTION OF THE DRAWINGS

The features and advantages of the multiplier according to the present invention will be more clearly appreciated from the following description taken in conjunction with the accompanying drawings in which:

FIG. 2 is a block diagram of a CPU to which the multiplier shown in FIG. 1 is applied;

FIGS. 4 to 8 are diagrams for assistance in explaining the principle and the operation of the multiplier shown in FIG. 1.

DETAILED DESCRIPTION OF THE PREFERRED EMBODIMENTS

With reference to the attached drawings, an embodiment of the present invention will be described.

Figure 1:
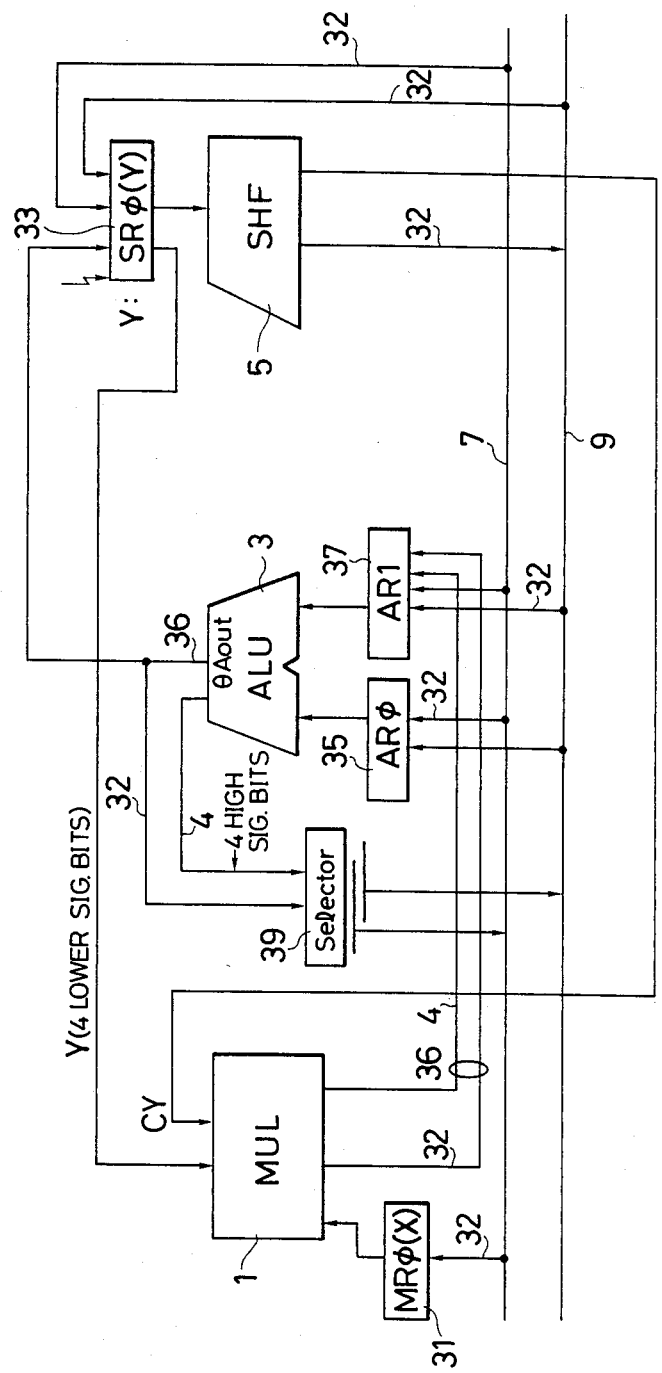
FIG. 1 is a block diagram of an embodiment of the multiplier according to the present invention.

In FIG. 1, the multiplier of the present invention comprises a partial product multiplication section (MUL) 1 for forming two partial products and adding these two partial products to obtain a partial product sum, an arithmetic and logical unit (ALU) 3 for accumulatively adding the partial product sum, and a barrel shifter section 5 for shifting a multiplier 4 bits by 4 bits (shifting out from the least significant bit (LSB) side) and transferring the shifted-out 4 bits to the partial product multiplication section 1.

The above three units or sections are connected to each other via two buses 7 and 9, and the multiplication operation can be attained in accordance with pipe line processing method through these bus lines 7 and 9.

The multiplier shown in FIG. 1 is used for achieving 32-bit multiplication operations, and incorporated in a 32-bit microprocessor (CPU) as shown in FIG. 2. In use, the multiplier is connected to the CPU via the buses 7 and 9 to achieve the pipe line processing. This CPU shown in FIG. 2 is connected to a storage unit (not shown) via an address bus interface 11 and a data bus interface 13 to read instructions such as multiplication instructions from the storage unit under the control of a memory management unit 15. The read instruction is set via the data bus interface 13 to a prefetch unit 17 and then decoded by an instruction decoder 19. The decoded instruction is fed via a pipe line controller 21 to other sections (such as MUL 1, SHT 5, and ALU 3 shown in FIGS. 1 and 2) under the control of the pipe line controller 21. Further, this CPU is provided with a CPU flag controller 25 and a register file 27.

With reference to FIG. 1 again, a MR$\phi$ register 31 for storing a 32-bit multiplicand X is connected to the partial product multiplication section MUL 1 to supply the multiplicand X to the MUL 1. This multiplicand X is set to the MR$\phi$ register 31 via the bus 7 under the control of the pipe line controller 21. Further, a SR$\phi$ register 33 for storing a 32-bit multiplier Y is connected to the shifter section 5 to supply a multiplier Y.

To the input of the ALU 3, an AR$\phi$ register 35 and an AR1 register 37 are connected. To the AR$\phi$ register 35, an output of the ALU 3 is set via a selector 39. The output of the ALU3 is an accumulatively added result of partial product sums as described later. To the AR1 register 37, a new partial product sum is set from the partial product multiplication section 1. The sum of both the inputs (accumulative partial product sum and new partial product sum) are calculated by the ALU 3. Further, a part of the accumulative partial product sum outputted from the ALU 3 (4 lower significant bits) is supplied to the SR$\phi$ register 33, and the remaining bits are supplied to the AR$\phi$ register 35 via the selector 39.

A multiplier Y set to the SR$\phi$ register 33 is supplied to the partial product multiplication section 1, 4 bits (lower significant) by 4 bits. The sum of these two partial products of the 4 lower significant bits and CY is calculated by the partial product multiplication section 1. The remaining 28 bits set in the SR$\phi$ register 33 are shifted rightward, that is, toward the LSD (the least significant digit) side 4 bits by 4 bits via the shifter section 5 and the bus 9, and are set again to the SR$\phi$ register 33 for the preparation for supplying the 4 lower bits to the partial product multiplication section 1. Further, the first bit of the result shifted out rightward 4 bits by 4 bits is supplied as a CY bit from the shifter section 5 to the partial product multiplication section 1.

This CY bit is "0" at the first partial product calculation as described later.

Figure 3B:
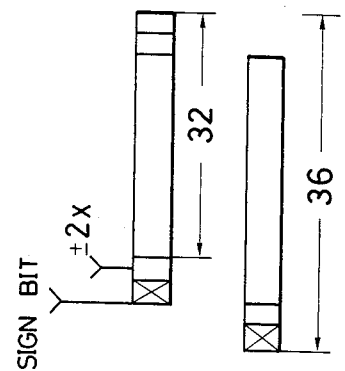
FIGS. 3(a) and 3(b) are block diagrams of partial product generating sections incorporated in the multiplier shown in FIG. 1.
Figure 3A:
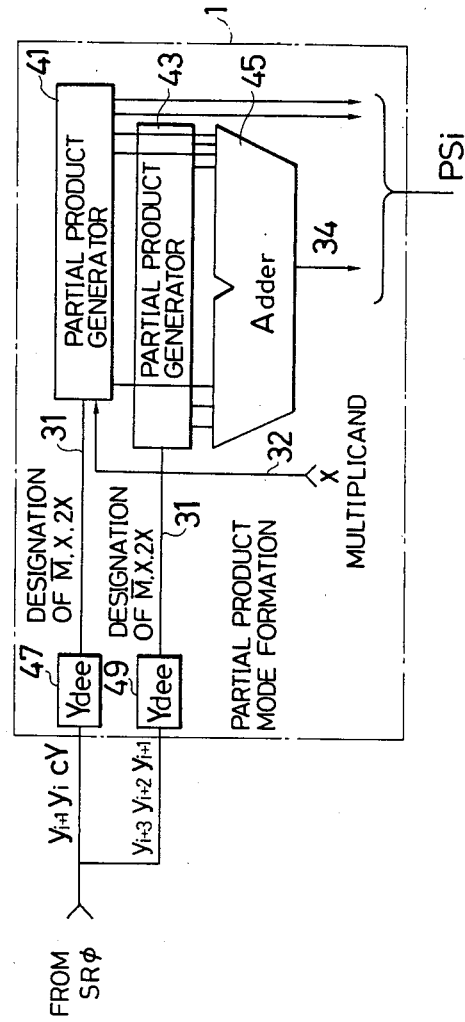

FIGS. 3(a) and 3(b) are more detailed block diagram of the partial product multiplication section 1, which includes two partial product generators 41 and 43 for simultaneously generating two partial products and an adder 45 for simultaneously adding two partial products outputted from these two partial product generators 41 and 43. Without generating partial products for each bit of a 32-bit multiplier Y as in the series multiplier, the partial product generators 41 and 43 form a plurality of partial multipliers (CY, $Y_i$, $Y_{i+1}$, $Y_{i+2}$, $Y_{i+3}$) by dividing the multiplier Y 3 bits by 3 bits beginning from the least significant digit, and calculates the partial products of each 3-bit partial multiplier (CY, $Y_i$, $Y_{i+1}$), ($Y_{i+1}$, $Y_{i+2}$, $Y_{i+3}$) and the 32-bit multiplicand X by applying the Booth method. Therefore, the partial product multiplication section 1 receives partial multiplier (CY, $Y_i$, $Y_{i+1}$, $Y_{i+2}$, $Y_{i+3}$) from the SRo register 33, and Barrel shifter and put. To obtain partial products on the basis of the partial multiplier (CY, $Y_i$, $Y_{i+1}$), ($Y_{i+1}$, $Y_{i+2}$, $Y_{i+3}$) in partial product mode or in the Booth method (as described later), there are provided two partial product mode generators 47 and 49 for generating decoded partial multiplier values to be decided on the basis of two 3-bit partial multipliers. The outputs of the partial product mode generators 47 and 49 are supplied to the partial product generators 41 and 43.

In the multiplier of the present invention, the partial product multiplication section 1 simultaneously forms two partial products of two 3-bit partial multipliers (CY, $Y_i$, $Y_{i+1}$), ($Y_{i+1}$, $Y_{i+2}$, $Y_{i+3}$) and a multiplicand X in accordance with Booth method, and accumulatively adds these two partial product sum in sequence to obtain a product. The above-mentioned principle will be described hereinbelow in further detail with reference to FIGS. 4 to 8.

In the usual situation, when a multiplication is effected manually, a multiplicand X is written on the upper side; a multiplier Y is written under and in parallel to the X; a line is drawn under the X and Y, partial products obtained by multiplying X by each digit of Y are written in sequence under the line; and all the partial products are added. In the Booth method, instead of obtaining partial products for each digit of the multiplier Y, a multiplier Y is divided 3 bits (digits) by 3 bits (digits) to effect plural partial multiplications corresponding to the divided multiplier of 3 bits; the multiplicand X is multiplied by the 3-bit divided multipliers to obtain partial products; and the final product is obtained by adding these partial products. When obtaining partial products of 3-bit divided partial multipliers of a multiplier Y and a multiplicand X, the binary values of 3-bit partial multipliers PPi (CY, $Y_i$, $Y_{i+1}$) or ($Y_{i+1}$, $Y_{i+2}$, $Y_{i+3}$) are not used, as they are, for multiplication to the multiplicand X, but partial multiplier values $V_{pp}$ decoded in accordance with the Booth's theory are used.

FIG. 4 shows an example of the Booth multiplication method, in which partial multiplier PPi, decoded partial multiplier values Vpp and partial products PDi of a multiplicand X=13 (00001101 in binary) and a multiplier Y=36 (00100100 in binary) are arranged in order.

In order to form partial multipliers PPi of the multiplier Y=$Y_7$, $Y_6$, $Y_5$, $Y_4$, $Y_3$, $Y_2$, $Y_1$, and $Y_0$ (=00100100) in 3-bit unit, an additional one bit $Y_{-1}$ of "0" is added below the least significant bit $Y_O$ as a CY bit; a first partial multiplier $PP_1$ is formed by three bits $Y_{-1}$, $Y_0$ and $Y_1$; a second partial multiplier $PP_2$ is formed by three bits $Y_1$, $Y_2$ and $Y_3$; and third and fourth partial multipliers $PP_3$ and $PP_4$ are formed in the same way. On the basis of these bits, partial products PDi (i.e. $PD_1$, $PD_2$, $PD_3$ and $PD_4$) are obtained by multiplying the multiplicand X by each partial multiplier PPi, and a product 468 (0000000 11101 0100 in binary) can be obtained by adding these partial products PDi. Although the partial multipliers PPi are formed 3 bits by 3 bits, since one of three bits is overlapped, the number of bits is reduced to 2 bits in practice. In the above multiplication example of 8 bits, 4 partial multipliers PPi are formed; four partial products PDi are formed for these four partial multiplier PPi, respectively. Further, in the case of 32-bit multiplication (i.e. a multiplicand X and a multiplier Y are each 32 bits), 16 partial products PDi are to be formed.

Figure 5:
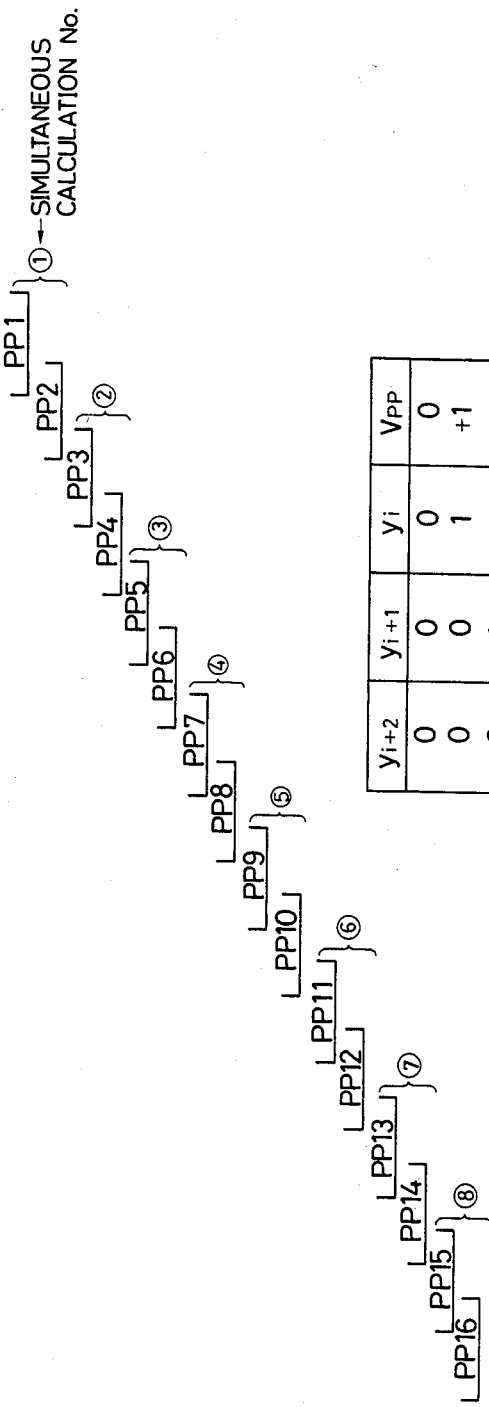

FIG. 5 shows partial multipliers $PP_1$, $PP_2$, $PP_3$-$PP_{16}$ of a multiplier $YI_i$ in 32-bit multiplication. In the Booth method, 16 partial multipliers PPi are formed to a 32-bit multiplicand X. In correspondence to these 16 partial multipliers PPi, 16 partial products PDi are formed, and these partial products PDi are added in sequence. Further, $Y_{-1}$ of "0" is added to below $Y_0$ to form the partial multiplier $PP_1$, and the least significant partial multiplier PPi is composed of $Y_{-1}$, $Y_0$, and $Y_1$.

In the present invention, however, the 16 partial products $PD_i$ are not formed separately, but partial products $PD_i$ are formed two by two at the same time.

In more detail, as shown in FIG. 5, two partial products $PD_i$ of PP1 and PP2, PP3 and PP4, PP5 and PP6, PP7 and PP8, PP9 and PP10, PP11 and PP12, PP13 and PP14, and PP15 and PP16 are formed simultaneously.

The two partial products $PD_i$ formed simultaneously are added 8 times to form 8 partial product sums $PS_i$. The product can be obtained by adding 8 partial product sums in sequence.

In this Booth method, as shown in FIG. 3, when the partial product $PD_i$ are formed by multiplying the multiplicand X by the partial multiplier $PP_i$, the partial multiplier $PP_i$ is not used as a numerical value, but decoded partial multipliers values Vpp obtained by decoding the partial multiplier $PP_i$ through the partial product mode generators 47 and 49 are used. Since the partial multiplier $PP_i$ is formed with 3 bits, although there exist 8 statues of 000, 001, 010,-111, the decoded partial multiplier values $V_{pp}$ as shown in FIG. 5 are used for the partial multiplier $PP_i$ corresponding to the 8 states; and the partial products $PD_i$ can be formed by multiplying the multiplicand X by the decoded partial multiplier value $V_{pp}$. In more detail, as well understood by the table shown in FIG. 5, the decoded partial multiplier value $V_{pp}$ is 0 when the partial multiplier $PP_i$ is 000 and 111,+1 when $PP_i$ is 001 and 010,+2 when $PP_i$ is 011, −2 when $PP_i$ is 100, and −1 when $PP_i$ is 101 and 110. Further, FIG. 4 is a table showing the relationship between the decoded partial multiplier value $V_{pp}$ and each partial multiplier $PP_i$ of the multiplier Y.

Booth algorithm and the decoded partial multiplier values $V_{pp}$ will be described hereinbelow.

Here, if a multiplicand X and a multiplier Y (n-bit numbers including a sign) are expressed as X=$X_{n-1}$, $X_{n-2}$-$X_0$, and Y=$Y_{n-1}$, $Y_{n-2}$,-$Y_0$, respectively, the both X and Y can be expressed as $$X = -2^{n-1} \cdot X_{n-1} + \sum_{i=0}^{n-2} 2^i \cdot X_i \quad (1)$$

$$Y = -2^{n-1} \cdot Y_{n-1} + \sum_{i=0}^{n-2} 2^i \cdot Y_i \quad (2)$$

if the number of digits of the multiplier Y is an even number and $Y_0$=0, the multiplier Y can be expressed as $$Y = -Y \cdot 2^{n-1} + Y_{n-1} \cdot 2^{n-2} \ldots + \quad (3)$$

$$Y_3 \cdot 2^2 + Y_2 \cdot 2^1 + Y_1 \cdot 2^0 =$$

$$(Y_{n-2} + Y_{n-1} - 2Y_n) \cdot 2^{n-2} +$$

$$\cdot$$
$$\cdot$$
$$\cdot$$

$$(Y_{n-4} + Y_{n-3} - 2Y_{n-2}) \cdot 2^{n-4} +$$

$$(Y_2 + Y_3 - 2Y_4) \cdot 2^2 + (Y_0 + Y_1 - 2Y_2) \cdot 2^0 = \quad (4)$$

$$\sum_{i=0}^{(n-2)/2} (Y_{2i} + Y_{2i+1} - 2Y_{2i+2}) \cdot 2^{2i}$$

As a result, the product P of the multiplicand X and the multiplier Y can be expressed as $$P = X \cdot Y \quad (5)$$
$$= \sum_{i=0}^{(n-2)/2} (Y_{2i} + Y_{2i+1} - 2Y_{2i+2}) \cdot X \cdot 2^{2i}$$

As understood by this expression (5), the number of partial products P of multiplicand X and multiplier Y is n/2. Further, the calculated values ($Y_{2i}$, $Y_{2i+1}$, $-2Y_{2i+2}$) shown by parentheses indicates the decoded partial multiplier value $V_{pp}$, that is, $0, \pm 1$, and $\pm 2$ as shown in FIG. 4. The multiplication operation given by the expression (5) is the Booth algorithm when executed, in which partial products $PD_i$ of the decoded partial multiplier value $V_{pp}$ and the multiplicand X of n/2 are required. FIG. 5 shows the partial multipliers $PP_1$ to $PP_{16}$ and the decoded partial multiplier values $V_{pp}$ when the multiplier Y is 32 bits. Further, in FIG. 5, the decoded partial multiplier $V_{pp}$=0 indicates that the multiplicand X is multiplied by "0"; $V_{pp}$+1 indicates that the multiplicand X is kept as it is; $V_{pp}$=−1 indicates that the multiplicand X is changed into a negative number; $V_{pp}$=+2 indicates that the multiplicand X is multiplied by two, that is, X is shifted one bit leftword; and $V_{pp} = -2$ indicates that the multiplicand X is multiplied by two and further changed into a negative number.

In the partial product multiplication section 1 shown in FIG. 3(a), the partial decoded multiplier values $V_{pp}$ corresponding to each partial multiplier $PP_i$ are formed by the partial product mode generators Ydee 47 and 49. The partial products $PD_i$ of the decoded partial multiplier value $V_{pp}$ and the multiplicand X are formed two by two simultaneously by the partial product generators 41 and 43. These two partial products $PD_i$ are added by the adder 45 to output the partial product sum $PS_i$. To obtain the partial product sum $PS_i$ by adding a first partial product $PD_i$ from the partial product generator 41 and a second partial product $PD_i$ from the partial product generator 43 through the adder 45, as shown in FIGS. 4 and 5, the partial product sum $PS_i$ is calculated by shifting the two partial product sums $PS_i$ 2 bits by 2 bits and by adding them through the adder 45. Here, the multiplicand X supplied to the adder 45 is of 32 bits, and the maximum number of the decoded partial multiplier value $V_{pp}$ is 2. This is to shift the multiplicand X one bit rightward. Further, two bits are shifted for addition of the partial product sum $PD_i$, and further one bit is necessary for a sign bit, so that the output data from the adder 45 is of 36 bits as shown in FIG. 3 (b).

As described above, the 32-bit partial product sum $PS_i$ calculated by the partial product multiplication section 1 is set to the AR1 register 37. The sums $PS_i$ are further accumulatively added to the accumulative result of the 36-bit partial product SUM $PS_i$ stored in the AR$\phi$ register 35 by the ALU3. Further, at the start of multiplication, the AR$\phi$ register 35 is set to "0".

Figure 6:
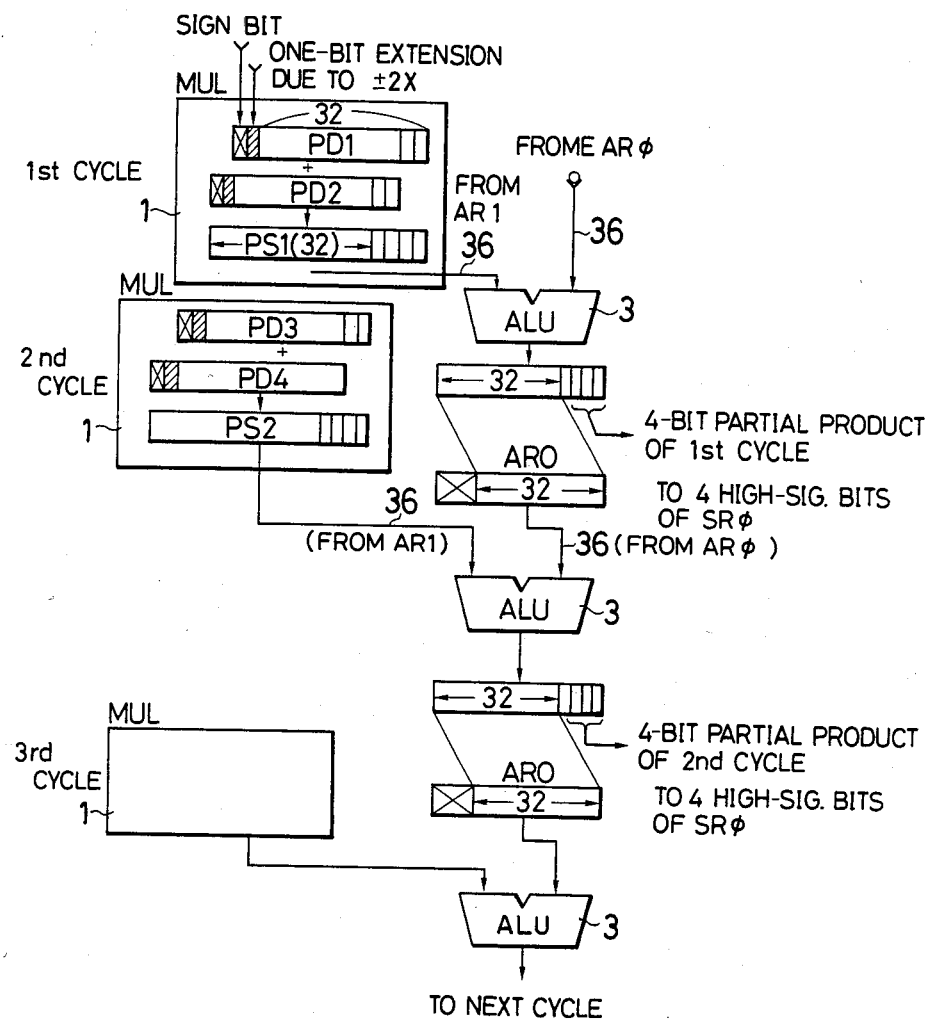

FIG. 6 explains the calculation of partial product sum $PS_i$ in the partial product multiplication section 1 and the accumulative addition processing in the ALU3.

As understood in FIG. 6, at the first-cycle, the adder 45 of the partial product multiplication section 1 adds a first partial product $PD_1$ and a second partial product $PD_2$, and the first partial product sum $PS_1$ is supplied to the ALU3 via the AR1 register 37. This first partial product sum PS1 is added to the accumulation result of the AR$\phi$ register 35 which is initially set to "0", so that a 36-bit accumulated result is outputted from the ALU3. Since 4 lower significant bits of a 36-bit accumulated result have already been decided by the 1st cycle multiplication, these bits are supplied to the SR$\phi$ register 33 as the high significant bits. The accumulated result of the remaining 32 higher-significant bits outputted from the ALU3 is set to the AR$\phi$ register 35 via the selector 39 as the 32 lower significant bits. A sign expansion bit is set to the 4 high significant bits of the AR$\phi$ register 35, so that the AR$\phi$ register 35 becomes 36 bits. This 36-bit accumulated result is supplied again from the AR$\phi$ register 35 to the ALU3, and added to the second partial product sum PS2 which is the second calculation result in the partial product multiplication section 1. Further, 4 bits of the 36-bit accumulated result from the ALU3 is supplied to the SR$\phi$ register 33 as the determined second-cycle 4-bits in the same way, and the remaining 32-bits are supplied to the ALU3 via a selector 39 together with the extended 4-bit sign. In the same way, the above calculation continues until the eighth partial product sum PS8 obtained by adding the 15th partial product PD15 and the 16th partial product sum PS16 is accumulatively added to the previous accumulated result by the ALU3.

To the partial product multiplication section 1, 4 bits constituting two partial multipliers $PP_i$ are supplied from the SRo register 33 in sequence. In synchronism with the one-cycle operation of the partical product multiplication section 1 as described above, 4 higher significant bits of the determined accumulated result are supplied to the 4 higher-significant bits of the SR$\phi$ Register 33 in sequence. In synchronism with these, 4 lower significant bits of the SR$\phi$ Register 33 are supplied in sequence to the partial product multiplication section 1.

Figure 7:
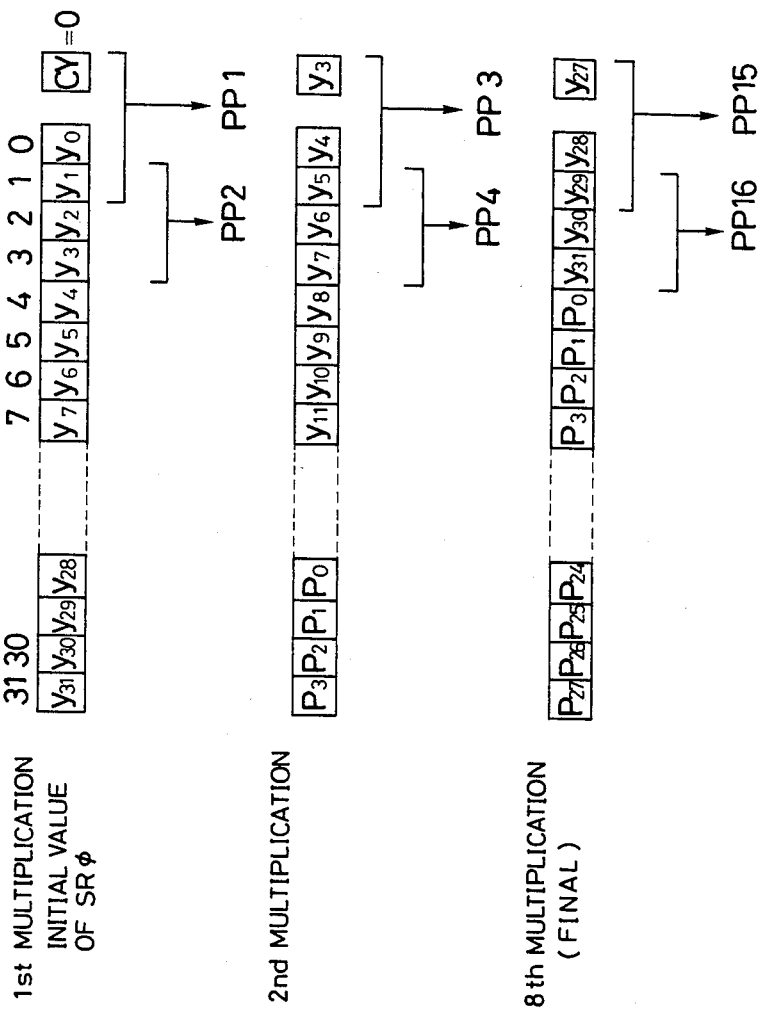
Figure 8:
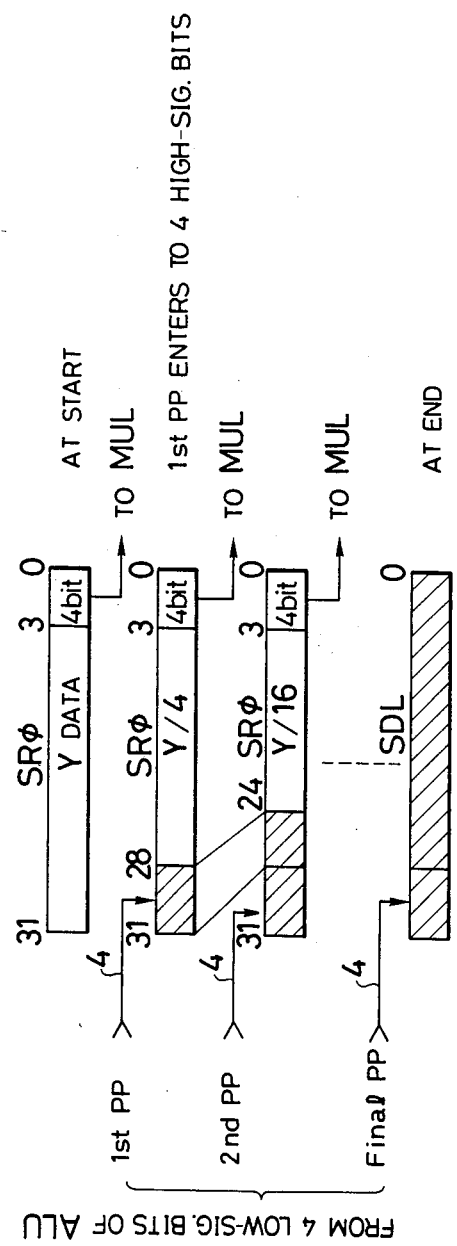

FIGS. 7 and 8 show the relationship between the shift operation of the shifter section 5 to the SR$\phi$ register 33 and the partial multiplier $PP_i$. As shown in the drawings, the multiplier Y $(= Y_0, Y_1, Y_2 \ldots Y_{29}, Y_{30}, Y_{31})$ initially set to the SR$\phi$ register 33 includes the least significant bit of "0" which is set as a CY bit. The 4 lower significant bits including the CY bit are divided into the first partial multiplier $PP_l$ (cy, $Y_0$, $y_l$) and the second partial multiplier $PP_2$ ($Y_1$, $Y_2$, $Y_3$), and supplied to the partial product mode generators 47 and 49 of the partial product multiplication section 1, respectively. On the basis of these, the first multiplication is achieved. Upon completion of the first multiplication, the stored value of the SR$\phi$ register 33 is shifted by 4 bits via the shifter section 5 and the bus 9, so that the 4 lower significant bits including the CY bit ($Y_3$, $Y_4$, $Y_5$, $Y_6$) are set.

As described above, the 4 lower significant bits determined on the basis of the accumulatively added result are supplied from the ALU3 to the 4 higher significant bits of the SR$\phi$ register 33 in order to achieve the second multiplication. In the same way, the above operation is repeated. In the case of the final eighth multiplication, the 4 most significant bits of the multiplicant Y are shifted to the 4 lower significant bits, and the determined accumulated result is set to the remaining 28 higher significant bits. When the 8th multiplication has been completed, the 32 lower significant bits of the product P are set to the SR$\phi$ register 33, and the 32 higher significant bits of the product P are set to the AR$\phi$ register 35.

As described above, in the embodiment of the present invention, two partial products PDi are added simultaneously to obtain partial product sums $PS_i$ in the partial product multiplication section 1; these partial product sums $PS_i$ are accumulatively added in sequence by the ALu3. To obtain the partial product sums $PS_i$ and the accumulative product addition, the partial multipliers $PP_i$ of the multiplier Y are shifted in sequence in the SR$\phi$ register 33 and the shifter section 5 for sequential multiplication operation. Further in order to achieve the sequential operation between the partial product multiplication section 1, the ALU3 and the shifter section 5, the pipe line method is adopted through the buses 7 and 9.

Further, although multiplication is achieved on the basis of the pipe line processing in the partial product multiplication section 1, the ALU3, and the hsifter 5, since multiplication is executed under the presence of signs in the ordinary Booth algorithm, correction is required in the case of the absence of signs. This correction method will be described below. If multiplicands and multipliers having no signs are designated as X*, Y* and those having signs are designated as X, Y, the following relation can be obtained between the two as follows:

$$X^* \cdot Y^* = X \cdot Y + 2^n Y_{n-1} \cdot X + 2^n X_{n-1} \cdot Y \qquad (6)$$

Therefore, to correct the results of multiplicand X and multiplier Y having signs into those having no signs, $2nY_{n-1} \cdot X$ and $2nX_{n-1} \cdot Y$ are added. This correction is made by means of the ALU. With respect to the correction of $2nY_{n-1} \cdot X$, X is added to the result when the most significant bit of the multiplier Y is "1", while "0" is added (nothing is made) when the most significant bit thereof is "0". With respect to the correction of $2nX_{n-1}Y$, Y is added to the result when the most significant bit of the multiplicand X is "1", while "0" is added (nothing is made) when the most significant bit thereof is "0".

To further clarify the above operation, the multiplication of 8-bit multiplicand X and 8-bit multiplier Y will be described with reference to the pipe line processing timing chart shown in FIG. 9.

Figure 9:
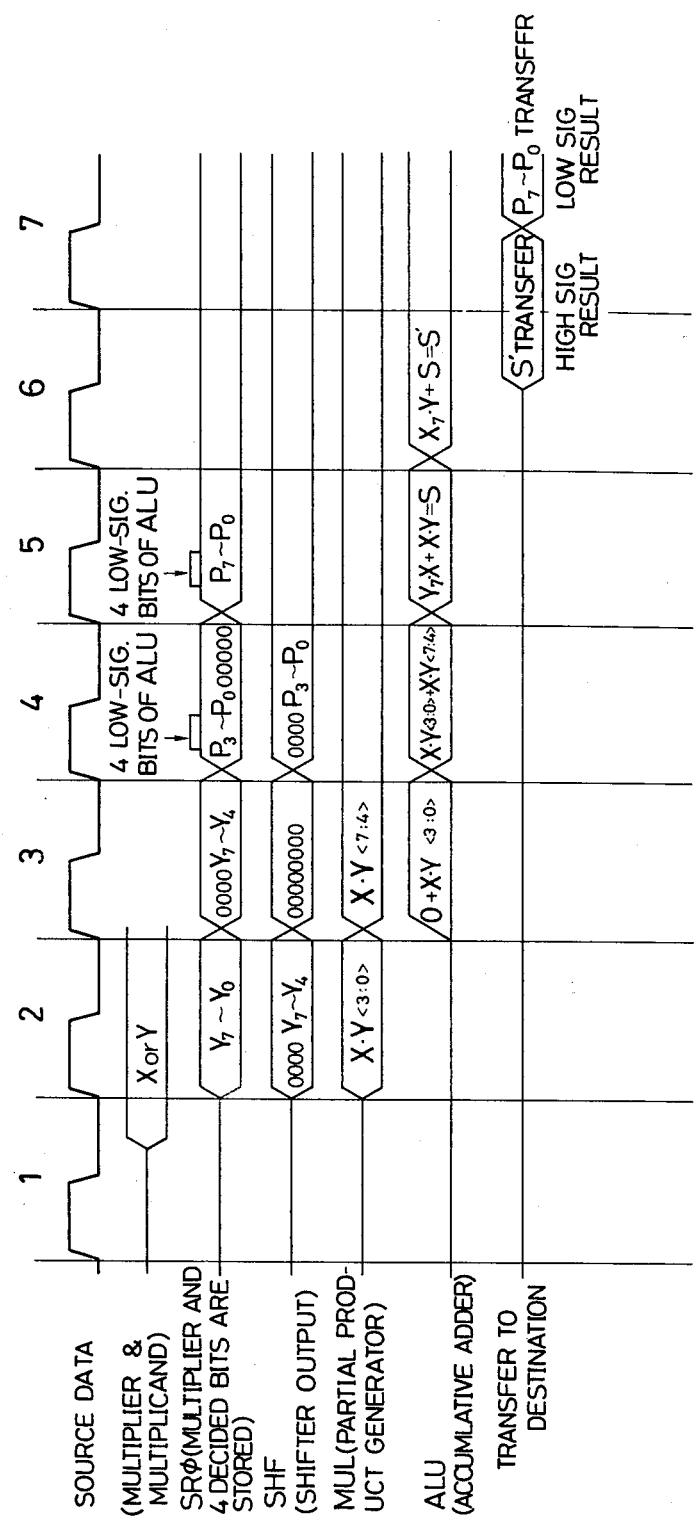
FIG. 9 is a timing chart for assistance in explaining the operation of the multiplier shown in FIG. 1.

In FIG. 9, each partial product sum $PS_i$, each accumulative addition operation, etc. are achieved for each cycle as designated by numerals shown at the uppermost position in FIG. 9. The multiplicand X and the multiplier Y are designated as $X_7, X_6, -X_1, X_0$ and $Y_7, Y_6-Y_1, Y_0$, respectively. The output of the SR$\phi$ register 33 is expressed by SRo; the output of the shifter section 5 is expressed as SHF; the output of the partial product multiplication section 1 is designated as MUL; and the output of the ALU3 is designated as ALU. In the SR$\phi$, "0000$Y_7$ to $Y_4$" indicates that $Y_7$ to $Y_0$ are shifted by 4 bits. In MUL, "X·Y<3:0>" indicates that 4 bits ($Y_3$ to $Y_0$) and CY bit of the multiplier Y are decoded in value to form partial products PD1 and 2 and the partial product sum PS is obtained. Further, in the SR$\phi$, the 4 lower significant bits $P_3$ to $P_0$ of the accumulative result determined by the ALU3 as shown in the fourth cycle, for instance, are supplied to the 4 higher significant bits; these bits are further shifted by 4 bits and the succeeding determined result is supplied in the fifth cycle as indicated by $P_7$ to $P_0$. In the ALU, the first accumulative addition "0+X·Y<3:0>" is achieved in the third cycle, and the second accumulative addition "X·Y<3:0>+X·Y <7:4>" is achieved in the fourth cycle.

First, the multiplicand X and the multiplier Y are supplied via the buses 7 and 9, respectively in the first cycle, and set to the MR$\phi$ register 31 and the SR$\phi$ 33, respectively, in the second step. When the multiplier Y is set to the SR$\phi$ register 33, the 4 lower significant bits of this multiplier Y are supplied to the partial product multiplication section 1; two decoded partial multiplier values $V_{pp}$ decoded by the partial product mode generators 47 and 49 of the partial product multiplication section 1 are supplied to the partial product generators 41 and 43, respectively to form two partial products $PD_i$; and these two partial products $PD_i$ are added by the adder 45 to obtain the partial product sum PS, that is, X. Y<3:0>. At the same time, the multiplier Y set to the SR$\phi$ register 33 is shifted by 4 bits through the shifter 5 as "0000 $Y_7$ to $Y_4$". As described above, in the second cycle, since the calculation of the partial product sums $PS_i$ and the shift operation are achieved simultaneously, the multiplication speed is increased.

In the third cycle, the multiplier Y shifted by the shifter section 5 is set to the SR$\phi$ register 33; the 4 lower significant bits of the shifted multiplier Y are supplied to the partial product multiplication section 1 to calculate X . Y <7:4> of the partial product sum PS of these 4-bits and the multiplicand X. Further, the multiplier Y set to the SR$\phi$ register 33 is further shifter by 4 bits through the shifter section 5 so that the output of the shifter section 5 is "0000 0000"; and X . Y<3:0> of the partial product sum PS is obtained as the first accumulative addition in the ALU 3 and "0+X.Y<3:0>" is indicated. Since no previous accumulative addition exists in the initial operation, "0" is indicated.

When the output of the shifter section 5 is supplied to the SRo register 33 in the third cycle, the 4 lower significant bits determined by the third-cycle accumulative addition in the ALU 3 as described above are supplied to the 4 higher significant bits of the SRo register 33 to obtain "$P_3$ to $P_0$ 0000". Further, the value of this SR$\phi$ register 33 is shifted by the shifter section 5, so that the output of the shifter section 5 is "0000 $P_3$ to $P_0$".

In the fourth cycle, since the calculation of the partial product sum PS has already been completed in the partial product multiplication Section 1, no information exists in the MUL 1. Therefore, in the ALU3, the partial product sum PS of X.Y<7:4> outputted from the partial product multiplication section 1 is accumulatively added to the previous accumulative addition result of X.Y<3:0> in the ALU3.

In the fifth cycle, the 4 lower significant bits determined on the basis of the fourth cycle accumulative addition in the ALU3 are supplied to the 4 higher significant bits of the SR$\phi$ register 33, so that the SR$\phi$ register 33 is set to "$P_7$ to $P_0$"; that is, the 8 lower significant bits of this multiplication are set to the register 33. At this moment, the operation has already been completed in the shifter section 5 and the partial product multiplication section 1. Further, the 8 higher significant bits of this multiplication are set to the ALU3. Further, if correction is required to the calculated results, the correction of $Y_7.X+X.Y=S$ is made beginning from the most significant bit of the multiplier Y. As already explained, since the multiplication is made under the presence of signs in the Booth algorithm, when no sign exists, the conversion from the presence of sign to the absence of sign is necessary for correction.

In the sixth cycle, the calculation of $X_7Y+S'$ is made beginning from the most significant bit of X when correction is required, and the calculated result is transferred to a desired destination within the same cycle.

Further, in the seventh cycle, the least significant multiplication result set to the SR$\phi$ register 33 is also transferred to a desired destination.

The multiplier of the present invention is made up of these blocks of the partial product multiplication section 1, the ALU (arithmetic and logical unit) 3 and the shifter section 5. Among these, the ALU3 and the shifter section 5 are usable in common with those already incorporated in a microprocessor, and only the partial product multiplication section 1 is newly required. Therefore, it is easy to integrate the multiplier with a microprocessor LSI, and hardware is relatively small in volume, thus it being possible to realize a high-performance LSI.

In comparison between the parallel method and the pipe line method with respect to the number of elements, 11,800 transistor elements are required in the parallel method, while 1,900 transistor elements are required in the pipe line method. Further, with respect to the number of clocks, the parallel method requires 4 clocks, while the pipe line method requires 13 clocks.

As described above, according to the present invention, since a product is obtained in such a way that a multiplier is divided into some segments including a predetermined number of bits (digits) to form a plurality of partial multipliers; a multiplicand is multiplied by each of two partial multipliers of them to obtain two partial products simultaneously; these two partial products are added to obtain partial product sums simultaneously; the above partial product sums are formed in sequence for all the partial multipliers; and all the partial product sums are accumulatively added in sequence.

Therefore, the processing speed is fairly high as compared with that of the series multiplication method; the number of hardware is very small as compared with the parallel multiplication method; the processing speed is roughly twice higher than that in the Booth method because two partial products are added simultaneously. That is to say, it is possible to achieve a multiplier which can attain a relatively high-speed multiplication operation in spite of an economical circuit configuration.

What is claimed is:

1. A Booth's multiplier comprising:
   (a) partial product multiplication means for simultaneously generating at least two partial products of a multiplier including at least two bits divided in sequence beginning from the least significant digit of the multiplier and a multiplicand and for calculating a sum of the at least two partial products;
   (b) calculating means for accumulatively adding the calculated partial product sums; and
   (c) shifter means for shifting the multiplier by the number of bits required to generate the plural partial products and for transferring the bits of the multiplier to said multiplication means whenever said multiplication means calculates one sum of the partial products.

2. The Booth'a multiplier as set forth in claim 1, wherein said partial product multiplication means comprises:
   (a) two partial product mode forming means for each forming a decoded partial multiplier value on the basis of a 3-bit partial multiplier in accordance with Booth's algorithm;
   (b) two partial product generating means for each generating a partial product of the decoded partial multiplier value and the multiplicand; and
   (c) adder means for adding the two partial products.

3. The Booth's multiplier as set forth in claim 2, wherein the partial products are obtained on the basis of calculations as listed below according to the value of a 3-bit multiplier ($Y_{i+2}$, $Y_{i+1}$, $Y_i$), where X denotes a multiplicand:

4. The multiplier as set forth in claim 1, wherein the number r of the partial products added by said multiplication means is $$2 \leq r < n/m$$

where n denotes the number of bits of the multiplier; and m denotes the number of bits included in respective bit groups.

5. The Booth's multiplier as set forth in claim 4, wherein each of the bit groups is made up of three bits.

6. The Booth's multiplier as set forth in claim 5, wherein the 4 lower significant bits determined as an accumulated result of said calculating means are stored in the 4 higher significant bits of a multiplicant shifted rightward.

7. The Booth's multiplier as set forth in claim 1, wherein the multiplication is effected in accordance with Booth algorithm.

8. The Booth's multiplier as set forth in claim 1, wherein the partial product calculation, the accumulative addition calculation and shifting calculation are processed in parallel in each of said partial product multiplication means, said calculating means and shifting means.

| $Y_{i+2}$ | $Y_{i+1}$ | $Y_i$ | CALCULATION |
|---|---|---|---|
| 0 | 0 | 0 | 0 |
| 0 | 0 | 1 | +X |
| 0 | 1 | 0 | +X |
| 0 | 1 | 1 | +2X |
| 1 | 0 | 0 | −2X |
| 1 | 0 | 1 | −X |
| 1 | 1 | 0 | −X |
| 1 | 1 | 1 | 0 |

9. A Booth's multiplier comprising:
   (a) partial multiplier forming means for forming a plurality of partial multiplier by dividing a multiplier into plural segments having plural predetermined digits including one overlap bit for each partial multiplier;
   (b) partial product sum forming means for forming a partial product sum by adding two partial products formed by simultaneously multiplying a multiplicand by each of two partial multipliers of a plurality of the divided partial multipliers; and
   (c) accumulative addition control means for controlling said partial product sum forming means so that partial product sums formed by said partial product sum forming means can sequentially be formed for all the partial multipliers in the same way as for the above two partial multipliers, and for accumulatively adding all the formed partial product sums.

10. A method of multiplying a multiplicand X by a multiplier Y, which comprises the following steps of: (a) dividing plural bits of the multiplier Y into a plurality of partial multipliers $PP_i$ ($Y_i$, $Y_{i+1}$, $Y_{i+2}$) of 3 bits;
   (b) simultaneously decoding at least two partial multipliers in accordance with Booth's theory to generate at least two decoded partial multiplier values $V_{pp}$;
   (c) simultaneously calculating at least two partial products $PD_i$ of the two decoded partial multiplier values $V_{pp}$ and each bit of the multiplicand X;
   (d) adding the simultaneously calculated at least two partial products $PD_i$ to obtain a partial product sum $PS_i$;
   (e) sequentially repeating the above steps from (a) to (d) for all the remaining partial multipliers by shifting each of bits of the multiplier; and (f) accumulatively adding all the calculated partial product sums.

* * * * *